(12) United States Patent
Sun et al.

(10) Patent No.: US 11,888,510 B2
(45) Date of Patent: Jan. 30, 2024

(54) TRANSMISSION/RECEPTION SEPARATION CIRCUIT, TRANSCEIVER, AND WIRELESS COMMUNICATIONS DEVICE

(71) Applicant: HUAWEI TECHNOLOGIES CO., LTD., Guangdong (CN)

(72) Inventors: Jie Sun, Shanghai (CN); Zhixiong Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 162 days.

(21) Appl. No.: 17/360,639

(22) Filed: Jun. 28, 2021

(65) Prior Publication Data

US 2021/0328619 A1 Oct. 21, 2021

Related U.S. Application Data

(63) Continuation of application No. PCT/CN2018/125100, filed on Dec. 28, 2018.

(51) Int. Cl.
*H04B 1/04* (2006.01)
*H04B 1/44* (2006.01)

(52) U.S. Cl.
CPC .................. *H04B 1/44* (2013.01); *H04B 1/04* (2013.01); *H04B 2001/0408* (2013.01)

(58) Field of Classification Search
None
See application file for complete search history.

(56) References Cited

U.S. PATENT DOCUMENTS 8,923,783 B2 * 12/2014 Ashizuka ............. H04B 1/0458
333/176
2007/0232241 A1 * 10/2007 Carley ..................... H04B 1/44
455/83

(Continued)

FOREIGN PATENT DOCUMENTS

CN 201398178 Y 2/2010
CN 102118149 A 7/2011
(Continued)

OTHER PUBLICATIONS

PCT International Search Report and Written Opinion issued in International Application No. PCT/CN2018/125100 dated Oct. 8, 2019, 17 pages (with English translation).

(Continued)

*Primary Examiner* — Pablo N Tran
(74) *Attorney, Agent, or Firm* — Fish & Richardson P.C.

(57) ABSTRACT

The present disclosure discloses example transmission/reception separation circuits and transceiver. One example transmission/reception separation circuit includes a transmission amplification circuit, an impedance adjustment circuit, and a reception amplification circuit. An output end of the transmission amplification circuit is connected to the impedance adjustment circuit. The impedance adjustment circuit is further connected to an input end of the reception amplification circuit. The second end of the impedance adjustment circuit and the input end of the reception amplification circuit are further configured to be connected to an antenna. The transmission amplification circuit amplifies a first signal to be transmitted. The reception amplification circuit amplifies a second signal received. When the antenna transmits the amplified first signal, a first impedance is in a high impedance state. The impedance adjustment circuit (Continued)

adjusts a second impedance to a high impedance state when the antenna receives the second signal.

13 Claims, 15 Drawing Sheets

(56)  References Cited

U.S. PATENT DOCUMENTS

| | | | |
|---|---|---|---|
| 2007/0262829 | A1 | 11/2007 | Chominski |
| 2008/0279262 | A1* | 11/2008 | Shanjani .................. H04B 1/48 |
| | | | 375/219 |
| 2010/0203844 | A1 | 8/2010 | Gorbachov |
| 2010/0289571 | A1 | 11/2010 | Hong et al. |
| 2010/0321129 | A1 | 12/2010 | Onody et al. |
| 2013/0078931 | A1 | 3/2013 | Jerng et al. |
| 2014/0128009 | A1* | 5/2014 | Yeh ...................... H04B 1/0458 |
| | | | 455/83 |

FOREIGN PATENT DOCUMENTS

| | | |
|---|---|---|
| CN | 102340322 A | 2/2012 |
| CN | 102356556 A | 2/2012 |
| CN | 103187987 A | 7/2013 |
| CN | 103986493 A | 8/2014 |
| CN | 205986856 U | 2/2017 |
| CN | 106575975 A | 4/2017 |
| CN | 107508560 A | 12/2017 |
| CN | 108400774 A | 8/2018 |
| CN | 108696344 A | 10/2018 |
| EP | 2272170 B1 | 1/2012 |
| WO | 2009124874 A1 | 10/2009 |

OTHER PUBLICATIONS

Sadhu et al., "7.2 A 28GHz 32-element phased-array transceiver IC with concurrent dual polarized beams and 1.4 degree beam-steering resolution for 5G communication," 2017 IEEE International Solid-State Circuits Conference (ISSCC), Mar. 6, 2017, 3 pages.

Office Action issued in Chinese Application No. 201880100485.5 dated May 6, 2022, 5 pages.

Yue, "Design of the 433MHz RF Bidirectioal Amplifier," Master Thesis, Dalian Maritime University, Mar. 2018, 91 pages (with English abstract).

Extended European Search Report issued in European Application No. 18944205.6 dated Nov. 24, 2021, 8 pages.

Office Action issued in Chinese Application No. 201880100485.8 dated Nov. 24, 2021, 15 pages (with English translation).

* cited by examiner

TRANSMISSION/RECEPTION SEPARATION CIRCUIT, TRANSCEIVER, AND WIRELESS COMMUNICATIONS DEVICE

CROSS-REFERENCE TO RELATED APPLICATIONS

This application is a continuation of International Application No. PCT/CN2018/125100, filed on Dec. 28, 2018, the disclosure of which is hereby incorporated by reference in its entirety.

TECHNICAL FIELD

This application relates to the field of wireless communications technologies, and in particular, to a transmission/reception separation circuit, a transceiver, and a wireless communications device.

BACKGROUND

The time division duplex (time division duplexing, TDD) technology is a full-duplex communications technology used in a mobile communications system, and is used to receive and send signals in different slots of a same frequency channel. To avoid mutual interference between a transmit channel and a receive channel, a TDD mode communications device may perform transmission/reception isolation by using a switch circuit.

A principle in which a TDD mode communications device performs transmission/reception isolation by using a switch circuit is shown in FIG. 1. In a transmit slot, an output port of a power amplifier (power amplifier, PA) at a transmit end of the TDD mode communications device is connected to an antenna by using a single-pole double-throw switch S, that is, the single-pole double-throw switch S is turned to the output port of the PA to transmit a signal. In this case, an input port of a low noise amplifier (low noise amplifier, LNA) at a receive end of the TDD mode communications device is disconnected from the antenna. In a receive slot, the input port of the LNA at the receive end of the TDD mode communications device is connected to the antenna by using the single-pole double-throw switch S, that is, the single-pole double-throw switch S is turned to the input port of the LNA to receive a signal. In this case, the output port of the PA at the transmit end of the TDD mode communications device is disconnected from the antenna.

However, a switch is introduced into the switch circuit on a main transmit channel, and consequently, a loss on the transmit channel is increased and transmission efficiency of the TDD mode communications device is reduced.

SUMMARY

This application provides a transmission/reception separation circuit, a transceiver, and a wireless communications device, to isolate a receive channel from a transmit channel while ensuring transmission efficiency.

According to a first aspect, this application provides a transmission/reception separation circuit, and the transmission/reception separation circuit includes a transmission amplification circuit, an impedance adjustment circuit, and a reception amplification circuit. An output end of the transmission amplification circuit is connected to a first end of the impedance adjustment circuit, a second end of the impedance adjustment circuit is connected to an input end of the reception amplification circuit, and the second end of the impedance adjustment circuit and the input end of the reception amplification circuit are further configured to be connected to an antenna.

The transmission amplification circuit is configured to amplify a first signal to be transmitted by using the antenna. The reception amplification circuit is configured to amplify a second signal received by using the antenna. When the antenna transmits the amplified first signal, a first impedance is in a high impedance state. The first impedance is an impedance seen from the input end of the reception amplification circuit. The impedance adjustment circuit is configured to adjust a second impedance to a high impedance state when the antenna receives the second signal. The second impedance is an impedance seen from the second end of the impedance adjustment circuit.

In the foregoing solution, for the transmission/reception separation circuit, when the antenna transmits the amplified first signal, the impedance seen from the input end of the reception amplification circuit in the transmission/reception separation circuit is in a high impedance state. When the antenna receives the second signal, the impedance adjustment circuit in the transmission/reception separation circuit adjusts the impedance seen from the second end of the impedance adjustment circuit to a high impedance state. In this way, transmission/reception separation may be implemented. In addition, when the antenna receives the second signal, a transmit channel is isolated from a receive channel by using the impedance adjustment circuit without introducing a switch element, thereby avoiding a loss on the transmit channel caused by a switch in a transmission/reception isolation process. Compared with a conventional technology, this solution can improve transmission efficiency.

In a possible implementation, the impedance adjustment circuit is a circuit formed through hybrid connection of a capacitor and an inductor, or a microstrip circuit.

In a possible implementation, the transmission amplification circuit may be but is unnecessarily implemented in any one of the following two manners:

Manner 1: The transmission amplification circuit includes a first switch and a first power amplifier. The first switch is separately connected to a power supply end of the first power amplifier and a power supply of the first power amplifier, and an output end of the first power amplifier is connected to the first end of the impedance adjustment circuit. When the antenna transmits the amplified first signal, the first switch is in a closed state; and when the antenna receives the second signal, the first switch is in an open state.

Manner 2: The transmission amplification circuit includes a first switch, a balanced combination amplification circuit, and a second switch. The first switch is separately connected to a power supply end of a power amplifier in the balanced combination amplification circuit and a power supply of the power amplifier in the balanced combination amplification circuit, an absorption load at an isolation end of the balanced combination amplification circuit is connected to the isolation end of the balanced combination amplification circuit by using the second switch, and an output end of the balanced combination amplification circuit is connected to the first end of the impedance adjustment circuit. When the antenna transmits the amplified first signal, the first switch and the second switch are in a closed state; and when the antenna receives the second signal, the first switch and the second switch are in an open state.

In a possible implementation, the balanced combination amplification circuit is a 3 dB bridge balanced combination amplification circuit. The isolation end of the 3 dB bridge balanced combination amplification circuit is connected to the absorption load by using the second switch, and the output end of the 3 dB balanced combination amplification circuit is connected to the first end of the impedance adjustment circuit.

In a possible implementation, the balanced combination amplification circuit is a Wilkinson balanced combination amplification circuit, and the transmission amplification circuit includes two second switches. Two ends of the absorption load at the isolation end of the Wilkinson balanced combination amplification circuit are separately connected in parallel at the isolation end of the Wilkinson balanced combination amplification circuit by using the second switches, and the output end of the Wilkinson balanced combination amplification circuit is connected to the first end of the impedance adjustment circuit.

In a possible implementation, the reception amplification circuit may be but is unnecessarily implemented in any one of the following two manners:

Manner 1: The reception amplification circuit includes a second power amplifier and a third switch. An input end of the second power amplifier is connected to a first end of the third switch, a second end of the third switch is connected to the second end of the impedance adjustment circuit, and the second end of the third switch is further configured to be connected to the antenna. When the antenna transmits the amplified first signal, the third switch is in an open state; and when the antenna receives the second signal, the third switch is in a closed state.

Manner 2: The reception amplification circuit includes a second power amplifier, a quarter-wave transformer, and a third switch. An input end of the second power amplifier is separately connected to a first end of the third switch and a first end of the quarter-wave transformer, a second end of the quarter-wave transformer is connected to the second end of the impedance adjustment circuit, the second end of the quarter-wave transformer is further configured to be connected to the antenna, and a second end of the third switch is grounded. When the antenna transmits the amplified first signal, the third switch is in a closed state; and when the antenna receives the second signal, the third switch is in an open state.

The second power amplifier may be a low noise amplifier LNA.

According to a second aspect, this application further provides a transmission/reception separation circuit, and the transmission/reception separation circuit includes a first switch, a balanced combination amplification circuit, a second switch, a third switch, an impedance adjustment circuit, and a reception amplification circuit. The first switch is separately connected to a power supply end of a power amplifier in the balanced combination amplification circuit and a power supply of the power amplifier in the balanced combination amplification circuit, an isolation end of the balanced combination amplification circuit is connected to an absorption load at the isolation end of the balanced combination amplification circuit by using the second switch, the isolation end of the balanced combination amplification circuit is connected to the impedance adjustment circuit by using the third switch, an output end of the balanced combination amplification circuit is connected to an input end of the reception amplification circuit, and the output end of the balanced combination amplification circuit and the input end of the reception amplification circuit are further configured to be connected to an antenna.

The balanced combination amplification circuit is configured to amplify a first signal to be transmitted by using the antenna. The reception amplification circuit is configured to amplify a second signal received by using the antenna. When the antenna transmits the amplified first signal, a first impedance is in a high impedance state. The first impedance is an impedance seen from the input end of the reception amplification circuit. The impedance adjustment circuit is configured to adjust a second impedance to a high impedance state when the antenna receives the second signal. The second impedance is an impedance seen from the output end of the balanced combination amplification circuit. When the antenna transmits the first signal, the first switch and the second switch are in a closed state, and the third switch is in an open state; and when the antenna receives the second signal, the first switch and the second switch are in an open state, and the third switch is in a closed state.

In the foregoing solution, for the transmission/reception separation circuit, when the antenna transmits the amplified first signal, the impedance seen from the input end of the reception amplification circuit in the transmission/reception separation circuit is in a high impedance state, and the antenna transmits the first signal amplified by the balanced combination amplification circuit in the transmission/reception separation circuit. When the antenna receives the second signal, the impedance adjustment circuit in the transmission/reception separation circuit adjusts the impedance seen from the output end of the balanced combination amplification circuit to a high impedance state, and the reception amplification circuit amplifies the second signal received by using the antenna. In this way, transmission/reception separation can be implemented. In addition, when the antenna receives the second signal, a transmit channel is isolated from a receive channel by using the impedance adjustment circuit without introducing a switch element, thereby avoiding a loss on the transmit channel caused by a switch in a transmission/reception isolation process. Compared with a conventional technology, this solution causes a relatively small loss on the transmit channel and can improve transmission efficiency.

In a possible implementation, the impedance adjustment circuit is a circuit formed through hybrid connection of a capacitor and an inductor, or a microstrip circuit.

In a possible implementation, the balanced combination amplification circuit is a 3 dB bridge balanced combination amplification circuit. The second switch is separately connected to the absorption load at the isolation end of the 3 dB bridge balanced combination amplification circuit and the isolation end of the 3 dB bridge balanced combination amplification circuit, and the third switch is separately connected to the isolation end of the 3 dB bridge balanced combination amplification circuit and the impedance adjustment circuit.

In a possible implementation, the balanced combination amplification circuit is a Wilkinson balanced combination amplification circuit, and the transmission amplification circuit includes two second switches, two third switches, and two impedance adjustment circuits. Two ends of the absorption load at the isolation end of the Wilkinson balanced combination amplification circuit are separately connected in parallel at the isolation end of the Wilkinson balanced combination amplification circuit by using the second switches, and each of the third switches is separately connected to the isolation end of the Wilkinson balanced combination amplification circuit and the corresponding impedance adjustment circuit.

In a possible implementation, the reception amplification circuit includes a second power amplifier and a fourth switch. An input end of the second power amplifier is connected to a first end of the fourth switch, a second end of the fourth switch is connected to the output end of the balanced combination amplification circuit, and the second end of the fourth switch is further configured to be connected to the antenna. When the antenna transmits the amplified first signal, the fourth switch is in an open state; and when the antenna receives the second signal, the fourth switch is in a closed state.

In a possible implementation, the reception amplification circuit includes a second power amplifier, a quarter-wave transformer, and a fourth switch. An input end of the second power amplifier is separately connected to a first end of the fourth switch and a first end of the quarter-wave transformer, a second end of the quarter-wave transformer is connected to the output end of the balanced combination amplification circuit, the second end of the quarter-wave transformer is further configured to be connected to the antenna, and a second end of the fourth switch is grounded. When the antenna transmits the amplified first signal, the fourth switch is in a closed state; and when the antenna receives the second signal, the fourth switch is in an open state.

According to a third aspect, this application provides a transceiver. The transceiver includes the antenna and the transmission/reception separation circuit according to any possible implementation of the first aspect or the second aspect.

According to a fourth aspect, this application provides a wireless communications device. The wireless communications device includes a processor and the transceiver according to any possible implementation of the third aspect. The processor is configured to control the transceiver to receive or send a signal.

DESCRIPTION OF EMBODIMENTS

To avoid mutual interference between a transmit channel and a receive channel, a TDD mode communications device performs transmission/reception isolation by using a switch circuit. However, for an existing switch circuit used for transmission/reception isolation, a switch is introduced onto a main transmit channel of the TDD mode communications device. Consequently, a loss on the transmit channel is increased and transmission efficiency of the TDD mode communications device is reduced. To resolve this problem in a conventional technology, this application provides a transmission/reception separation circuit, a transceiver, and a wireless communications device, to implement transmission/reception isolation without introducing a switch onto the main transmit channel.

In addition, it should be understood that, in the description of this application, "a plurality of" refers to two or more. Terms such as "first" and "second" are used only for distinguishing between descriptions, but cannot be understood as an indication or implication of relative importance, and cannot be understood as an indication or implication of a sequence.

To make the objectives, technical solutions, and advantages of this application clearer, the following further describes this application in detail with reference to the accompanying drawings.

Figure 1:
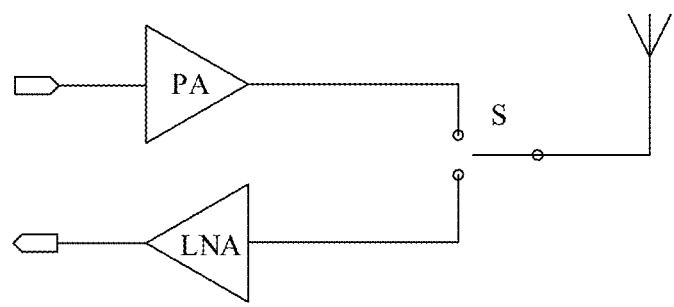
FIG. 1 is a schematic structural diagram of a switch circuit used for transmission/reception isolation in a conventional technology.
Figure 2:
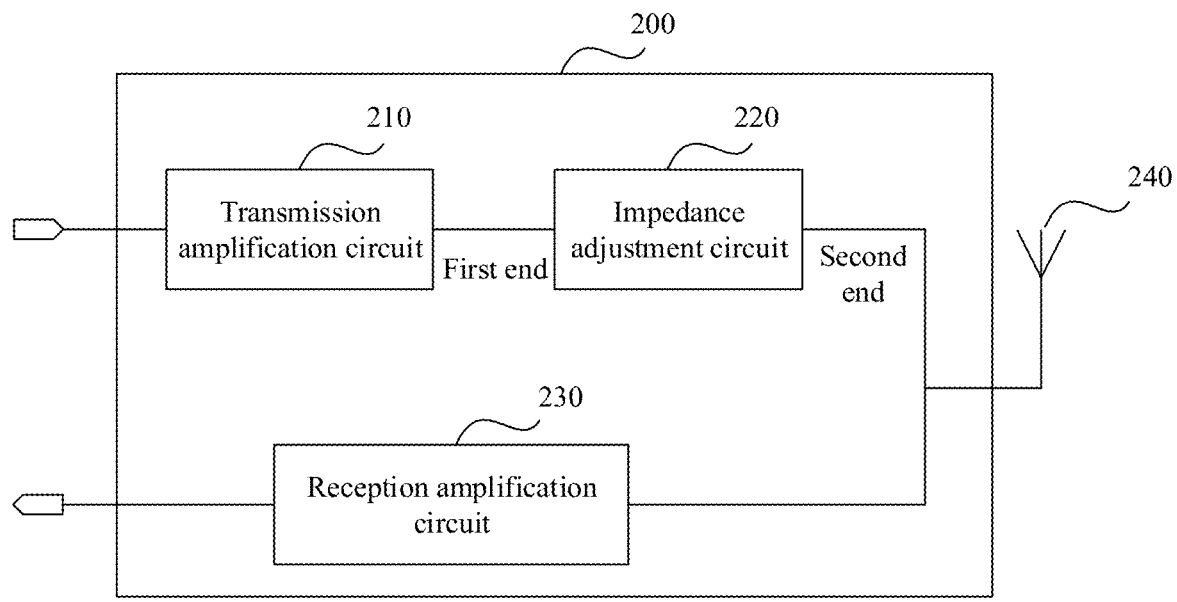
FIG. 2 is a schematic structural diagram of a transmission/reception separation circuit according to an embodiment of this application.

As shown in FIG. 2, this application provides a transmission/reception separation circuit 200, and the transmission/reception separation circuit 200 includes a transmission amplification circuit 210, an impedance adjustment circuit 220, and a reception amplification circuit 230. An output end of the transmission amplification circuit 210 is connected to a first end of the impedance adjustment circuit 220, a second end of the impedance adjustment circuit 220 is connected to an input end of the reception amplification circuit 230, and the second end of the impedance adjustment circuit 220 and the input end of the reception amplification circuit 230 are further configured to be connected to an antenna 240.

The transmission amplification circuit 210 is configured to amplify a first signal to be transmitted by using the antenna 240. The reception amplification circuit 230 is configured to amplify a second signal received by using the antenna 240. When the antenna 240 transmits the amplified first signal, a first impedance is in a high impedance state. The first impedance is an impedance seen from the input end of the reception amplification circuit 230. The impedance adjustment circuit 220 is configured to adjust a second impedance to a high impedance state when the antenna 240 receives the second signal. The second impedance is an impedance seen from the second end of the impedance adjustment circuit 220.

Figure 3A:
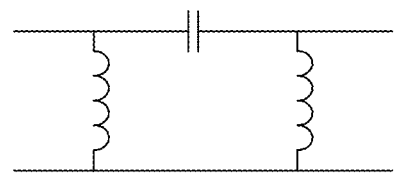
FIG. 3a is a schematic structural diagram of an impedance adjustment circuit according to an embodiment of this application.
Figure 3B:
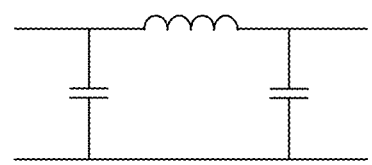
FIG. 3b is a schematic structural diagram of another impedance adjustment circuit according to an embodiment of this application.

The impedance adjustment circuit 220 may be a circuit formed through hybrid connection of a capacitor and an inductor, such as an LCL (L represents the inductor, and C represents the capacitor) circuit shown in FIG. 3a or a CLC circuit shown in FIG. 3b; or the impedance adjustment circuit 220 may be a microstrip circuit, such as a microstrip.

Figure 4:
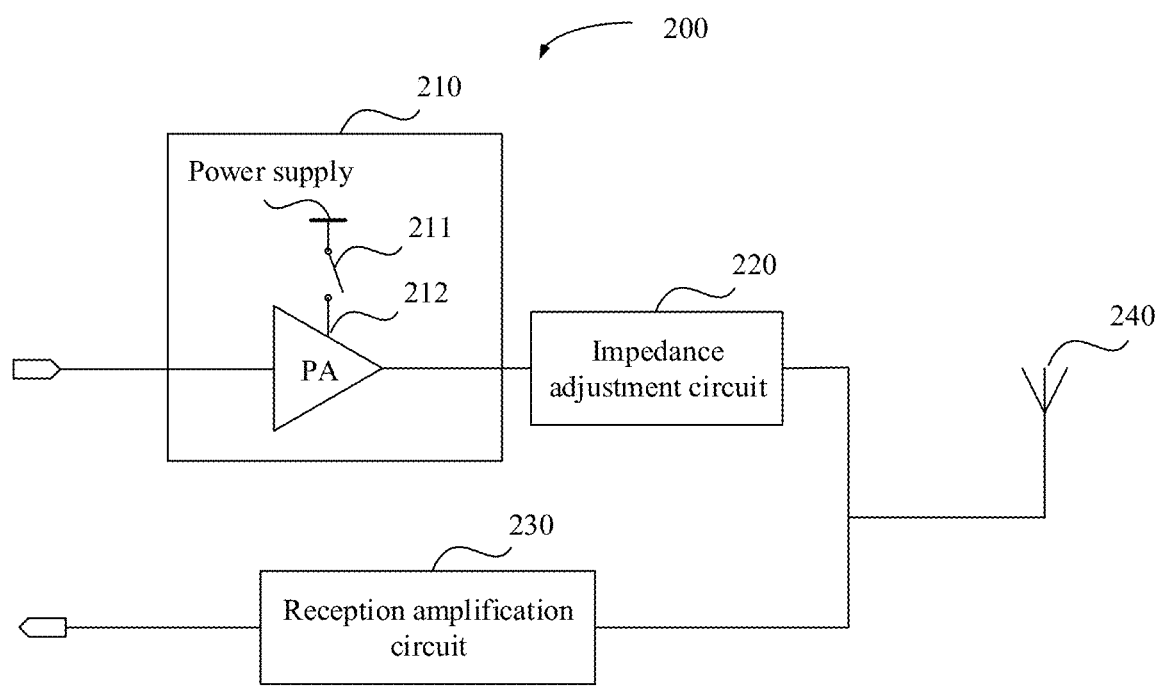
FIG. 4 is a first schematic structural diagram of a transmission amplification circuit according to an embodiment of this application.

In specific implementation, the transmission amplification circuit 210 may be but is unnecessarily implemented in any one of the following two manners:

Manner 1: As shown in FIG. 4, the transmission amplification circuit 210 includes a first switch 211 and a first power amplifier 212. The first switch 211 is separately connected to a power supply end of the first power amplifier 212 and a power supply of the first power amplifier 212, and an output end of the first power amplifier 212 is connected to the first end of the impedance adjustment circuit 220. The power amplifier usually includes at least one bipolar junction transistor (bipolar junction transistor, BJT) or at least one metal-oxide-semiconductor field-effect transistor (metal-oxide-semiconductor field-effect transistor, MOSFET). The power supply end of the first power amplifier 212 is a base of the BJT or a gate of the MOSFET.

When the antenna 240 transmits the amplified first signal, the first switch 211 is in a closed state; and when the antenna 240 receives the second signal, the first switch is in an open state. To be specific, when the antenna 240 needs to transmit the amplified first signal, the first switch 211 is in a closed state, so that the first power amplifier 212 can work to amplify the first signal. In addition, when the antenna 240 transmits the amplified first signal, the first impedance is in a high impedance state. When the antenna 240 receives the second signal, the first switch 211 is in an open state, and the first power amplifier 212 does not work. The impedance adjustment circuit 220 adjusts the second impedance to a high impedance state, and the reception amplification circuit 230 amplifies the second signal received by using the antenna 240. In this way, transmission/reception separation may be implemented.

Figure 5:
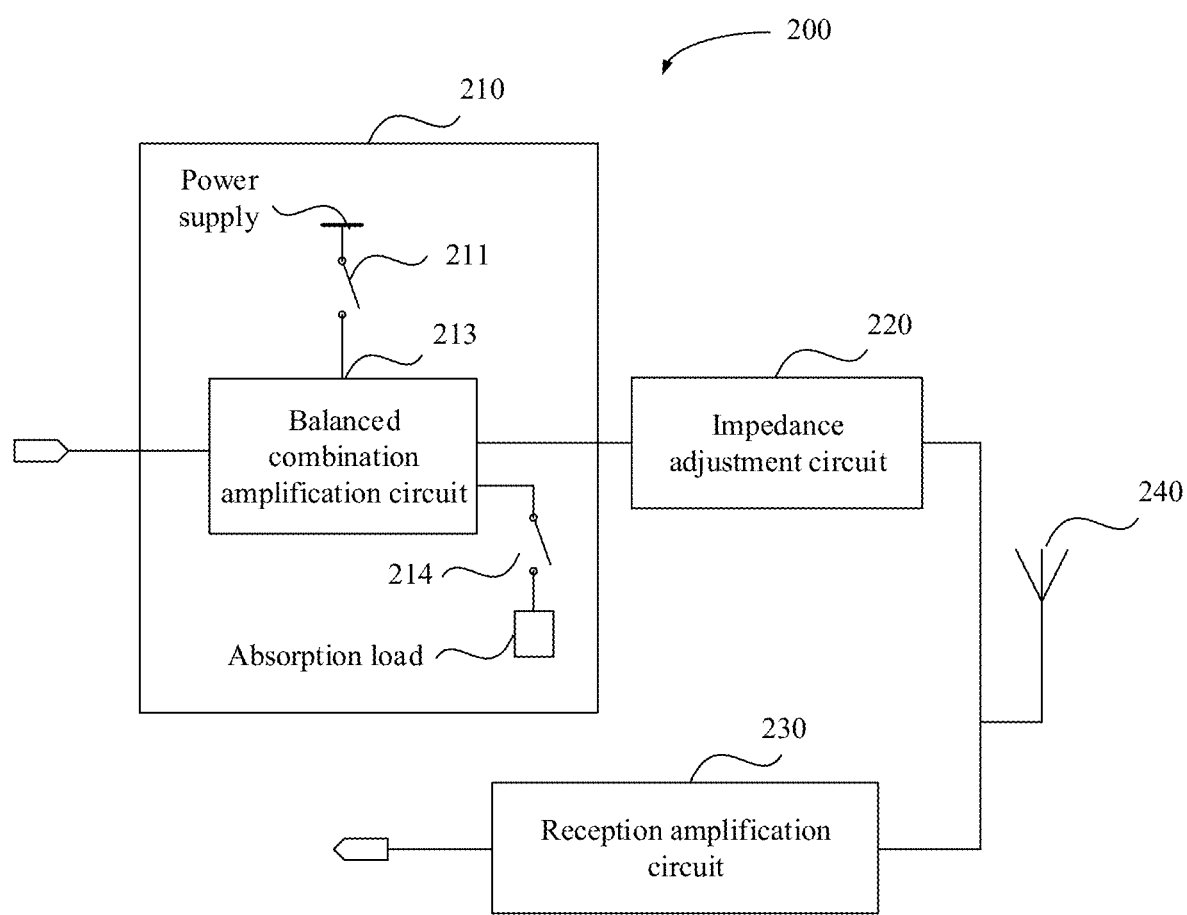
FIG. 5 is a second schematic structural diagram of a transmission amplification circuit according to an embodiment of this application.

Manner 2: As shown in FIG. 5, the transmission amplification circuit 210 includes a first switch 211, a balanced combination amplification circuit 213, and a second switch 214. The first switch 211 is separately connected to a power supply end of a power amplifier in the balanced combination amplification circuit 213 and a power supply of the power amplifier in the balanced combination amplification circuit 213, an absorption load at an isolation end of the balanced combination amplification circuit 213 is connected to the isolation end of the balanced combination amplification circuit 213 by using the second switch 214, and an output end of the balanced combination amplification circuit 213 is connected to the first end of the impedance adjustment circuit 220. Usually, the balanced combination amplification circuit 213 includes a plurality of power amplifiers. Therefore, the transmission amplification circuit 210 includes a plurality of first switches 211, and each of the first switches 211 corresponds to a power amplifier.

When the antenna 240 transmits the amplified first signal, the first switch 211 and the second switch 214 are in a closed state; and when the antenna 240 receives the second signal, the first switch 211 and the second switch 214 are in an open state. To be specific, when the antenna 240 needs to transmit the amplified first signal, the first switch 211 and the second switch 214 are in a closed state, so that the balanced combination amplification circuit 213 can work to amplify the first signal. In addition, when the antenna 240 transmits the amplified first signal, the first impedance is in a high impedance state. When the antenna 240 receives the second signal, the first switch 211 and the second switch 214 are in an open state, and the balanced combination amplification circuit 213 does not work. The impedance adjustment circuit 220 adjusts the second impedance to a high impedance state, and the reception amplification circuit 230 amplifies the second signal received by using the antenna 240. In this way, transmission/reception separation may be implemented.

Figure 6:
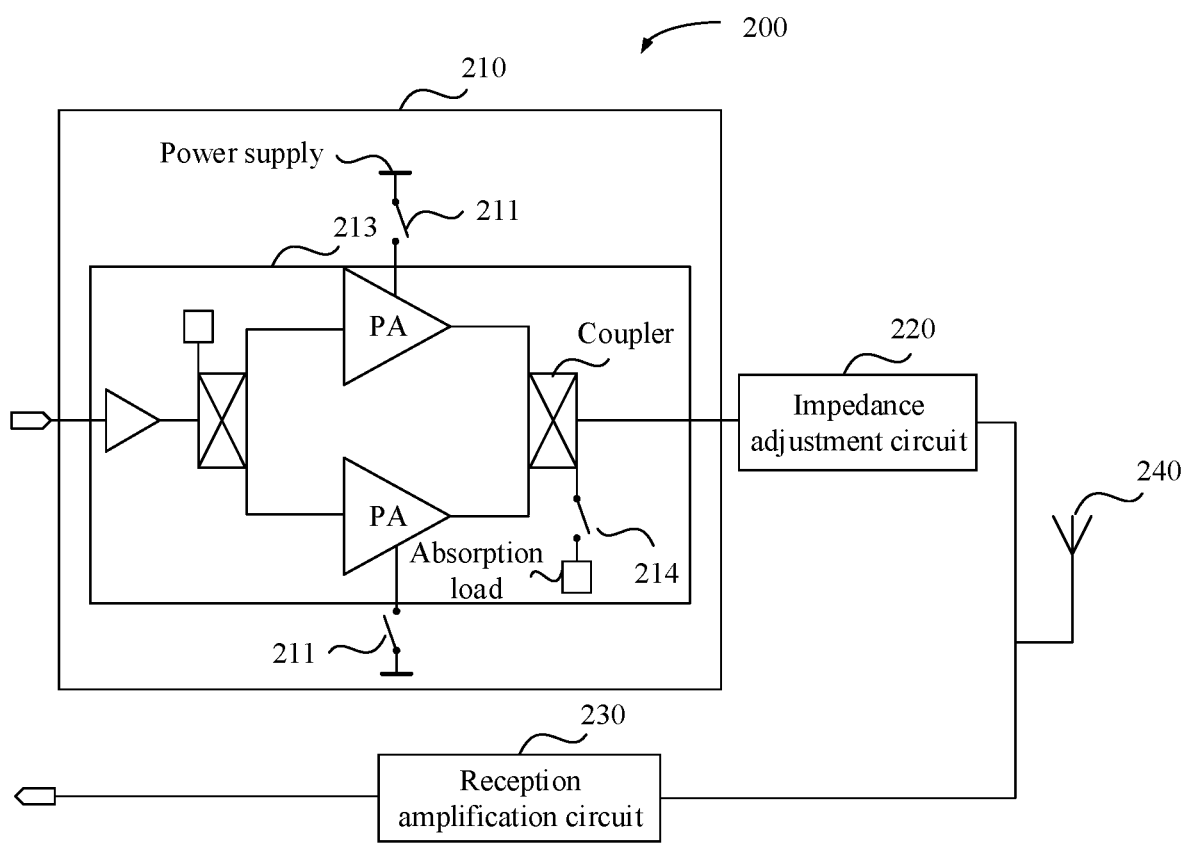
FIG. 6 is a third schematic structural diagram of a transmission amplification circuit according to an embodiment of this application.
Figure 7:
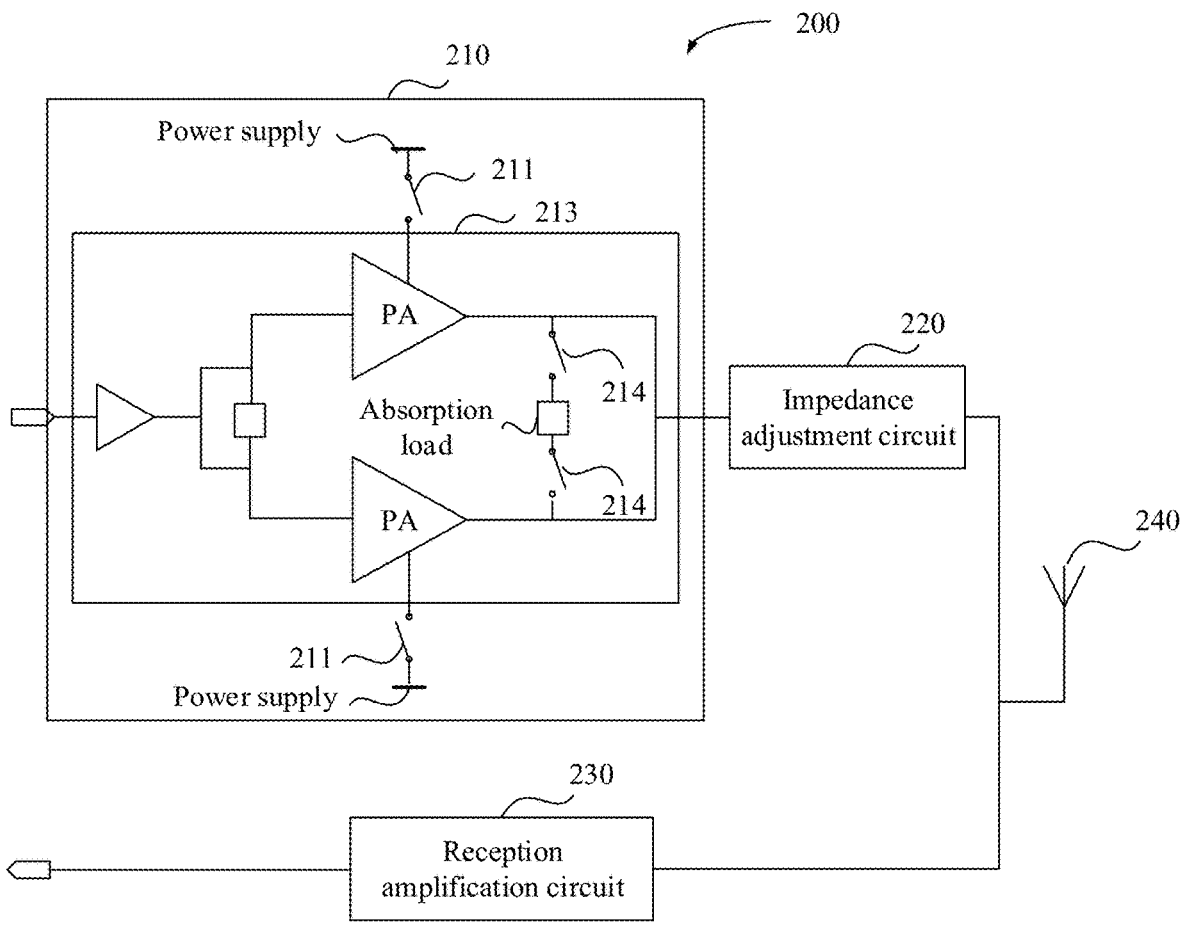
FIG. 7 is a fourth schematic structural diagram of a transmission amplification circuit according to an embodiment of this application.

The balanced combination amplification circuit 213 may be a 3 dB bridge balanced combination amplification circuit or a Wilkinson balanced combination amplification circuit. As shown in FIG. 6, when the balanced combination amplification circuit 213 is a 3 dB bridge balanced combination amplification circuit, the isolation end of the 3 dB bridge balanced combination amplification circuit is connected to the absorption load by using the second switch 214, and the output end of the 3 dB balanced combination amplification circuit is connected to the first end of the impedance adjustment circuit 220. As shown in FIG. 7, when the balanced combination amplification circuit 213 is a Wilkinson balanced combination amplification circuit, the transmission amplification circuit 210 includes two second switches 214, two ends of the absorption load at the isolation end of the Wilkinson balanced combination amplification circuit are separately connected in parallel at the isolation end of the Wilkinson balanced combination amplification circuit by using the second switches 214, and the output end of the Wilkinson balanced combination amplification circuit is connected to the first end of the impedance adjustment circuit 220.

Figure 8:
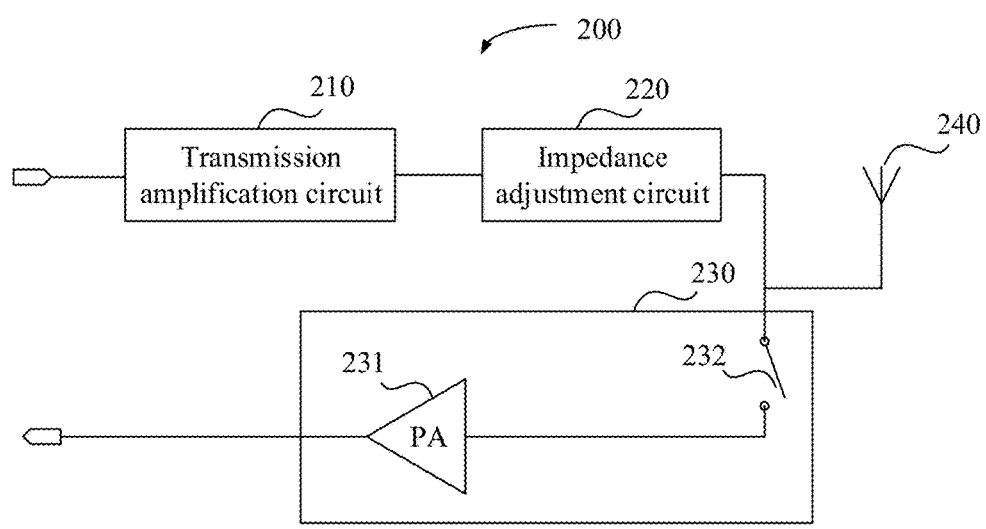
FIG. 8 is a first schematic structural diagram of a reception amplification circuit according to an embodiment of this application.

In specific implementation, the reception amplification circuit 230 may be but is unnecessarily implemented in any one of the following two manners:

Manner A: As shown in FIG. 8, the reception amplification circuit 230 includes a second power amplifier 231 and a third switch 232. An input end of the second power amplifier 231 is connected to a first end of the third switch 232, a second end of the third switch 232 is connected to the second end of the impedance adjustment circuit 220, and the second end of the third switch 232 is further configured to be connected to the antenna 240. In this case, the input end of the reception amplification circuit 230 is the second end of the third switch 232.

When the antenna 240 transmits the amplified first signal, the third switch 232 is in an open state; and when the antenna receives the second signal, the third switch 232 is in a closed state. To be specific, when the antenna 240 needs to transmit the amplified first signal, the third switch 232 is in an open state, and the second power amplifier 231 is open-circuited. In this case, the first impedance is in a high impedance state, and the transmission amplification circuit 210 amplifies the first signal. When the antenna 240 receives the second signal, the third switch 232 is in a closed state, the impedance adjustment circuit 220 adjusts the second impedance to a high impedance state, and the second power amplifier 231 amplifies the second signal received by using the antenna 240. In this way, transmission/reception separation may be implemented.

Figure 9:
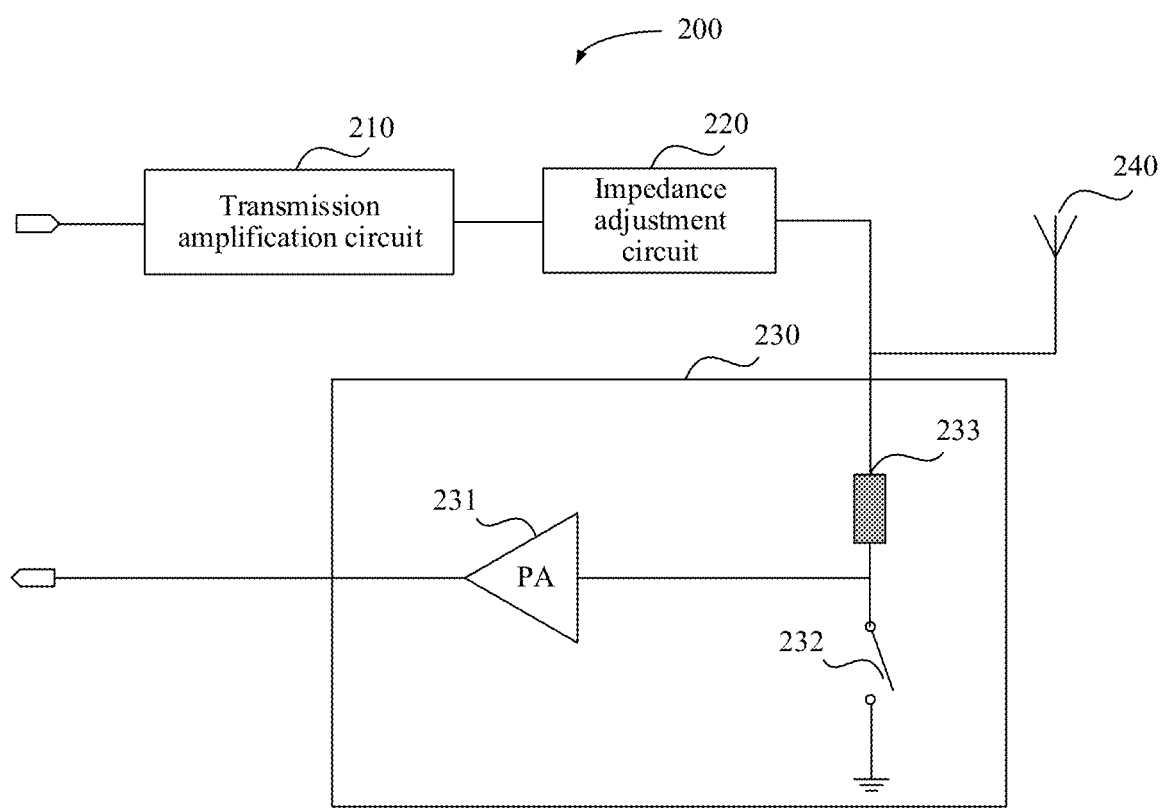
FIG. 9 is a second schematic structural diagram of a reception amplification circuit according to an embodiment of this application.

Manner B: As shown in FIG. 9, the reception amplification circuit 230 includes a second power amplifier 231, a quarter-wave transformer 233, and a third switch 232. An input end of the second power amplifier 231 is separately connected to a first end of the third switch 232 and a first end of the quarter-wave transformer 233, a second end of the quarter-wave transformer 233 is connected to the second end of the impedance adjustment circuit 220, the second end of the quarter-wave transformer 233 is further configured to be connected to the antenna 240, and a second end of the third switch 232 is grounded. In this case, the input end of the reception amplification circuit 230 is the second end of the quarter-wave transformer 233. The second power amplifier 231 is usually an LNA.

When the antenna 240 transmits the amplified first signal, the third switch 232 is in a closed state; and when the antenna receives the second signal, the third switch 232 is in an open state. To be specific, when the antenna 240 needs to transmit the amplified first signal, the third switch 232 is in a closed state. Because a receive channel is grounded by using the quarter-wave transformer 233, the first impedance is in a high impedance state, and the transmission amplification circuit 210 amplifies the first signal. When the antenna 240 receives the second signal, the third switch 232 is in an open state, the impedance adjustment circuit 220 adjusts the second impedance to a high impedance state, and the second power amplifier 231 amplifies the second signal received by using the antenna 240. In this way, transmission/reception separation may be implemented.

In the foregoing solution, for the transmission/reception separation circuit 200, when the antenna 240 transmits the amplified first signal, the impedance seen from the input end of the reception amplification circuit 230 in the transmission/reception separation circuit 200 is in a high impedance state. When the antenna 240 receives the second signal, the impedance adjustment circuit 220 in the transmission/reception separation circuit 200 adjusts the impedance seen from the second end of the impedance adjustment circuit 220 to a high impedance state. In this way, transmission/reception separation may be implemented. In addition, when the antenna 240 receives the second signal, a transmit channel is isolated from a receive channel by using the impedance adjustment circuit 220 without introducing a switch element, thereby avoiding a loss on the transmit channel caused by a switch in a transmission/reception isolation process. Compared with a conventional technology, this solution causes a relatively small loss on the transmit channel and can improve transmission efficiency.

Figure 10:
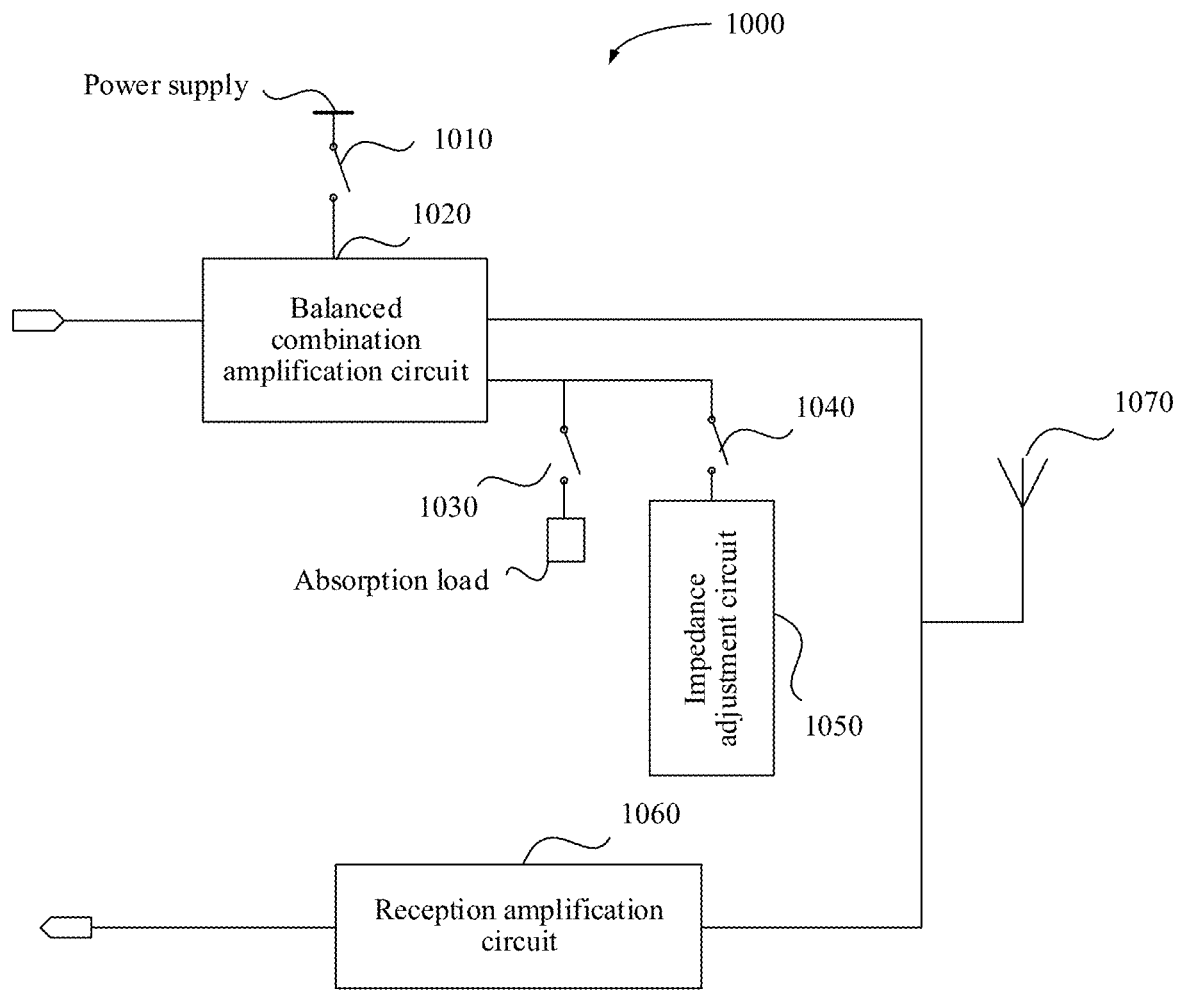
FIG. 10 is a first schematic structural diagram of another transmission/reception separation circuit according to an embodiment of this application.

As shown in FIG. 10, this application further provides a transmission/reception isolation circuit 1000, and the transmission/reception isolation circuit 1000 includes a first switch 1010, a balanced combination amplification circuit 1020, a second switch 1030, a third switch 1040, an impedance adjustment circuit 1050, and a reception amplification circuit 1060. The first switch 1010 is separately connected to a power supply end of a power amplifier in the balanced combination amplification circuit 1020 and a power supply of the power amplifier in the balanced combination amplification circuit 1020, an isolation end of the balanced combination amplification circuit 1020 is connected to an absorption load at the isolation end of the balanced combination amplification circuit 1020 by using the second switch 1030, the isolation end of the balanced combination amplification circuit 1020 is connected to the impedance adjustment circuit 1050 by using the third switch 1040, an output end of the balanced combination amplification circuit 1020 is connected to an input end of the reception amplification circuit 1060, and the output end of the balanced combination amplification circuit 1020 and the input end of the reception amplification circuit 1060 are further configured to be connected to an antenna 1070.

Specifically, the balanced combination amplification circuit 1020 is configured to amplify a first signal to be transmitted by using the antenna 1070, and the reception amplification circuit 1060 is configured to amplify a second signal received by using the antenna. When the antenna 1070 transmits the amplified first signal, a first impedance is adjusted to a high impedance state. The first impedance is an impedance seen from the input end of the reception amplification circuit. The impedance adjustment circuit 1050 is configured to adjust a second impedance to a high impedance state when the antenna 1070 receives the second signal. The second impedance is an impedance seen from the output end of the balanced combination amplification circuit 1020. When the antenna 1070 transmits the first signal, the first switch 1010 and the second switch 1030 are in a closed state. In this case, the balanced combination amplification circuit 1020 is in a working state, and the third switch 1040 is in an open state. When the antenna 1070 receives the second signal, the first switch 1010 and the second switch 1030 are in an open state, and the third switch 1040 is in a closed state.

Usually, the balanced combination amplification circuit 1020 includes a plurality of power amplifiers. Therefore, the transmission/reception separation circuit 1000 includes a plurality of first switches 1010, and each of the first switches 1010 corresponds to a power amplifier. The balanced combination amplification circuit 1020 may be a 3 dB bridge balanced combination amplification circuit or a Wilkinson balanced combination amplification circuit. The impedance adjustment circuit 1050 is a circuit formed through hybrid connection of a capacitor and an inductor, such as an LCL circuit shown in FIG. 3a or a CLC circuit shown in FIG. 3b; or the impedance adjustment circuit 1050 may be a microstrip circuit, such as a microstrip.

Figure 11A:
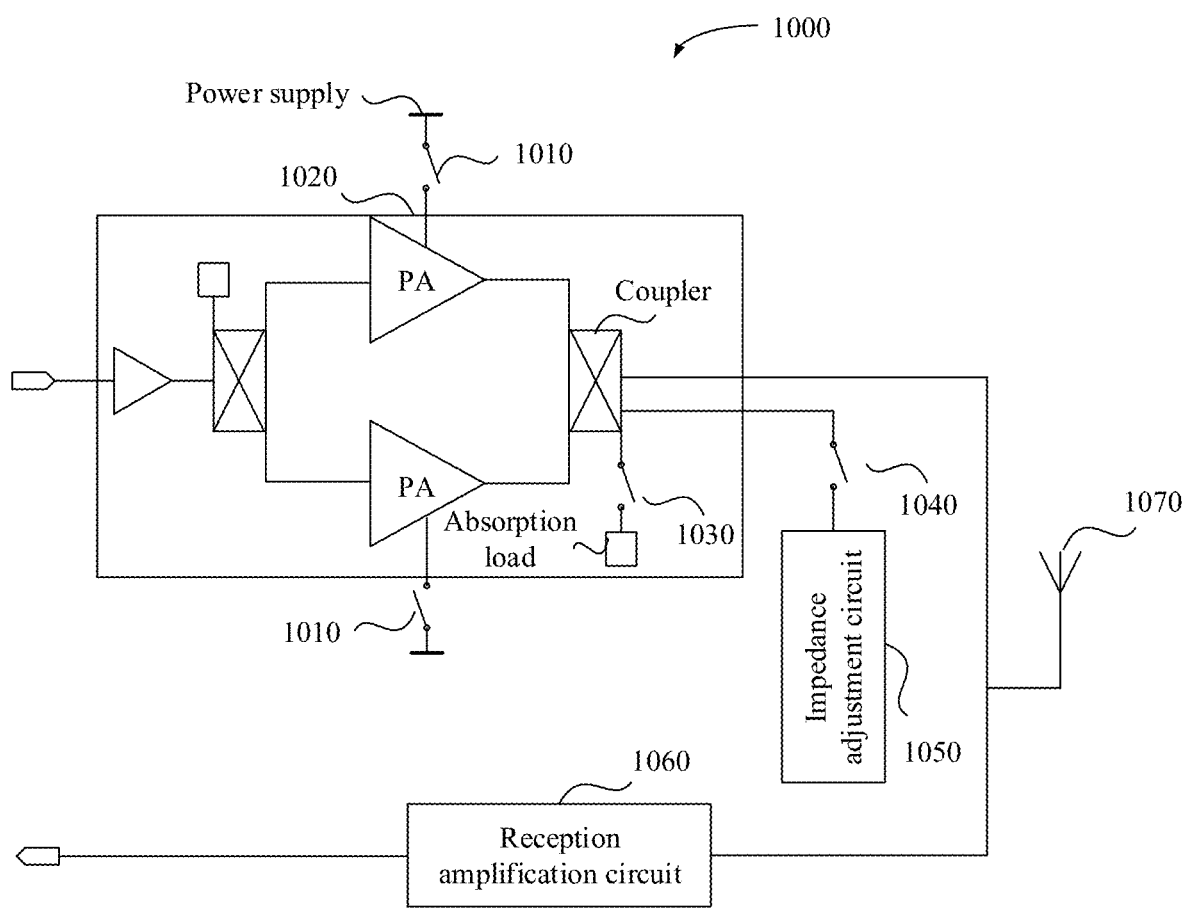
FIG. 11a is a second schematic structural diagram of another transmission/reception separation circuit according to an embodiment of this application.
Figure 11B:
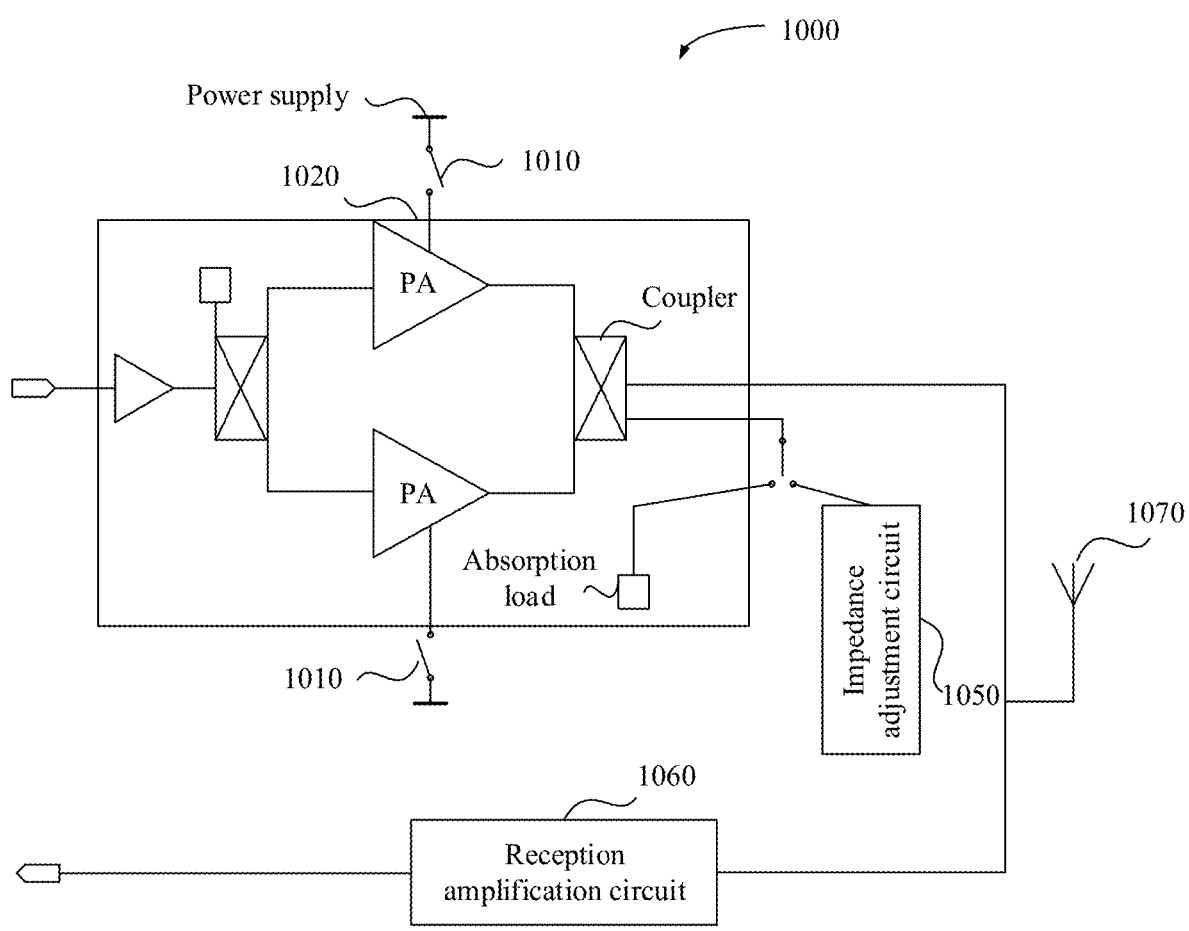
FIG. 11b is a third schematic structural diagram of another transmission/reception separation circuit according to an embodiment of this application.
Figure 12A:
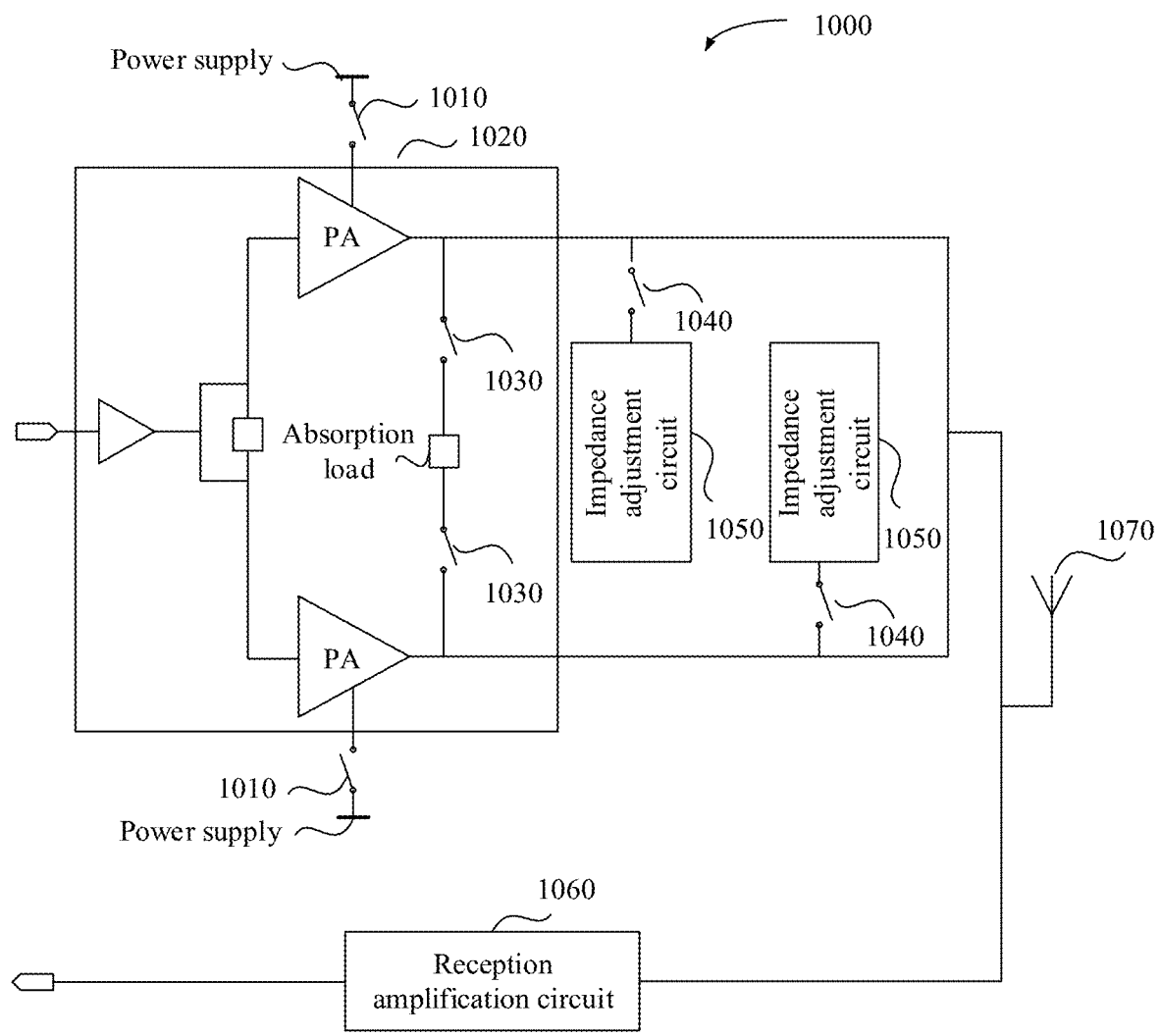
FIG. 12a is a fourth schematic structural diagram of another transmission/reception separation circuit according to an embodiment of this application.
Figure 12B:
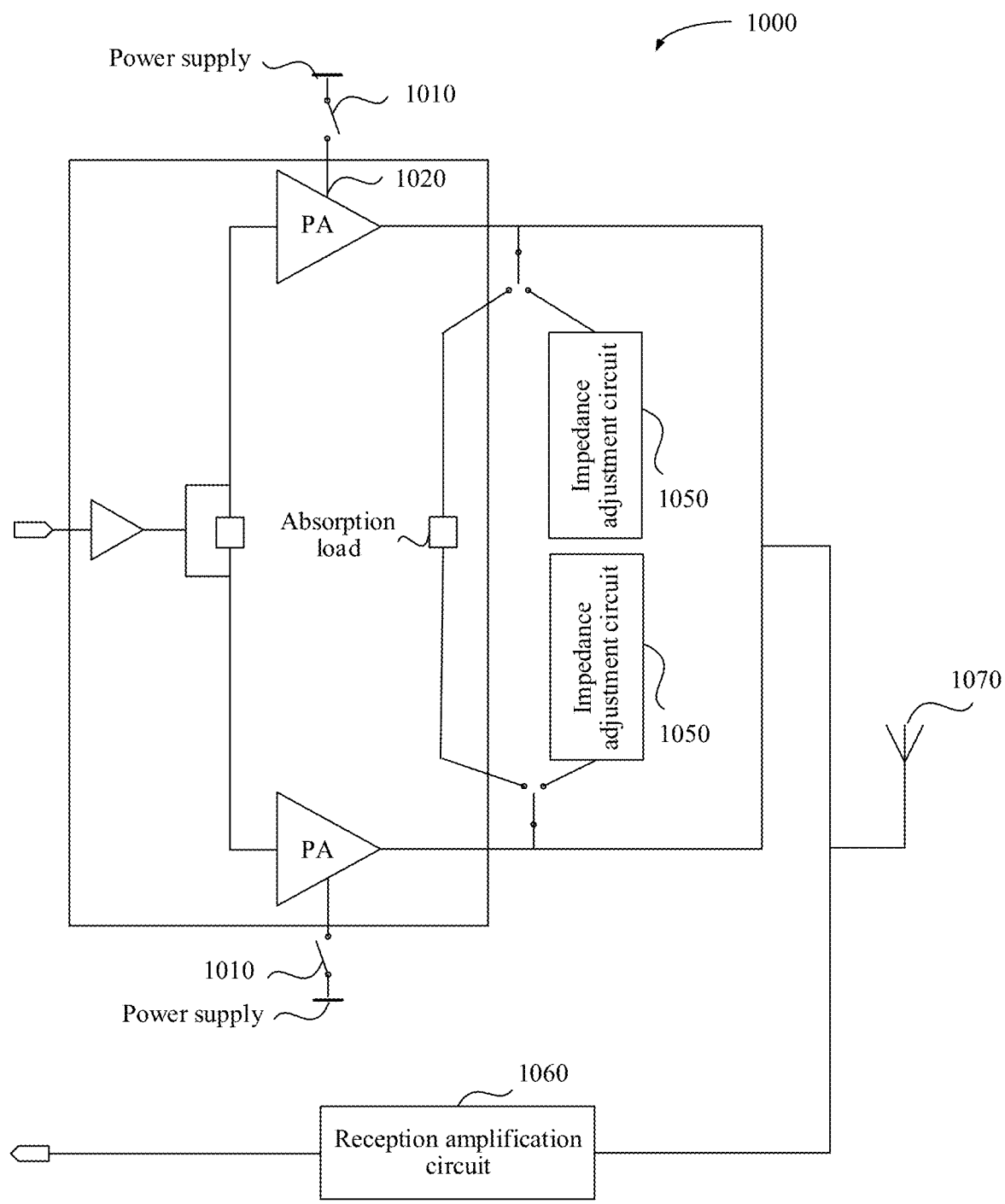
FIG. 12b is a fifth schematic structural diagram of another transmission/reception separation circuit according to an embodiment of this application.

In specific implementation, as shown in FIG. 11a, when the balanced combination amplification circuit 1020 is a 3 dB bridge balanced combination amplification circuit, the second switch 1030 is separately connected to the absorption load at the isolation end of the 3 dB bridge balanced combination amplification circuit and the isolation end of the 3 dB bridge balanced combination amplification circuit, and the third switch 1040 is separately connected to the isolation end of the 3 dB bridge balanced combination amplification circuit and the impedance adjustment circuit. In addition, when the balanced combination amplification circuit 1020 is the 3 dB bridge balanced combination amplification circuit, functions of the second switch 1030 and the third switch 1040 may be implemented by using a single-pole double-throw switch, as shown in FIG. 11b. As shown in FIG. 12a, when the balanced combination amplification circuit 1020 is a Wilkinson balanced combination amplification circuit, the transmission amplification circuit includes two second switches, two third switches 1040, and two impedance adjustment circuits 1050, two ends of the absorption load at the isolation end of the Wilkinson balanced combination amplification circuit are separately connected in parallel at the isolation end of the Wilkinson balanced combination amplification circuit by using the second switches, each of the impedance adjustment circuits 1050 is connected to the isolation end of the Wilkinson balanced combination amplification circuit by using the corresponding third switch 1040. In addition, when the balanced combination amplification circuit 1020 is the Wilkinson balanced combination amplification circuit, functions of the two second switches 1030 and the two third switches 1040 may be implemented by using a single-pole double-throw switch, as shown in FIG. 12b.

Figure 13:
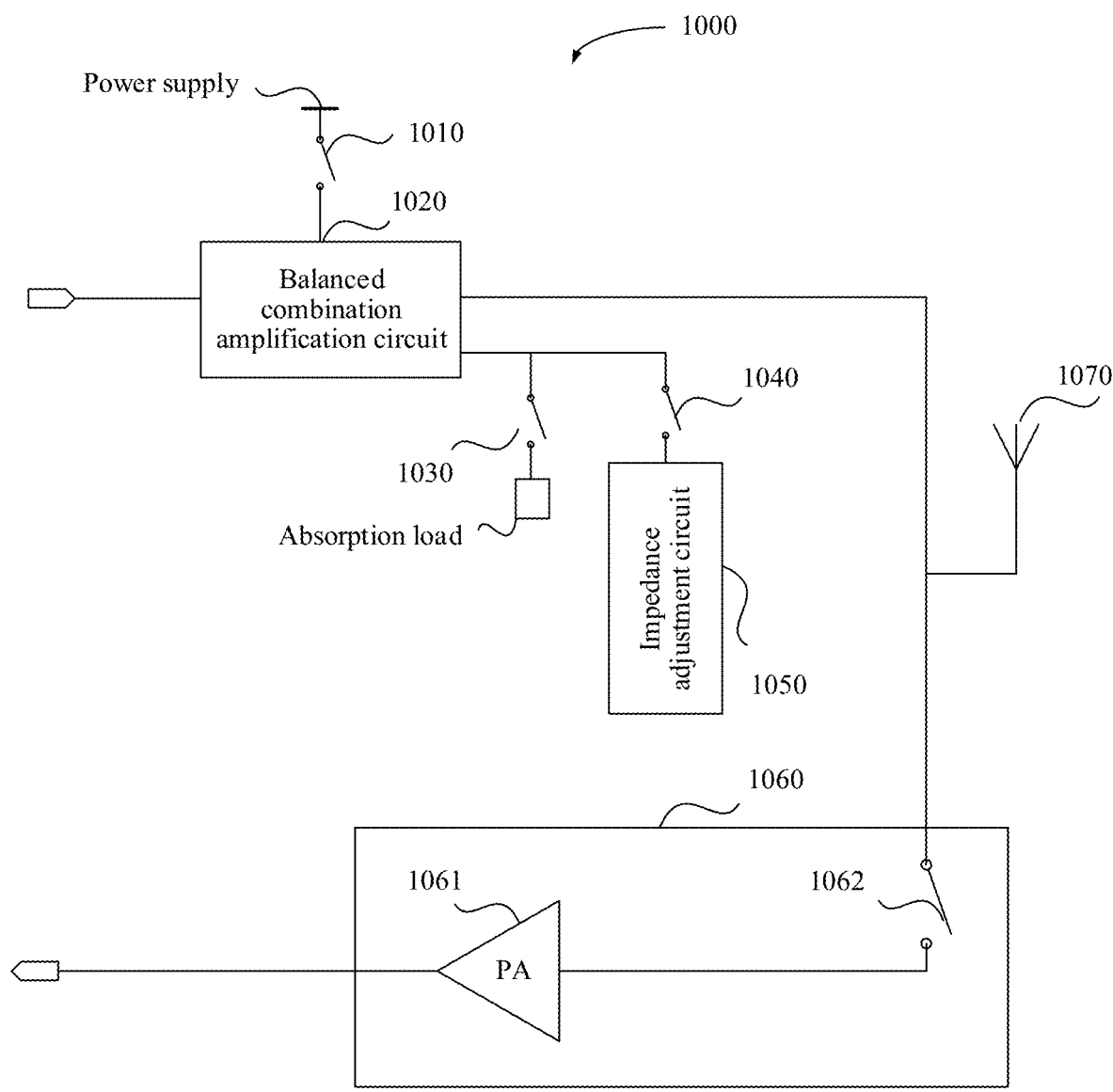
FIG. 13 is a first schematic structural diagram of a reception amplification circuit in another transmission/reception separation circuit according to an embodiment of this application.

In specific implementation, the reception amplification circuit 1060 may be but is unnecessarily implemented in any one of the following two manners:

Manner 1: As shown in FIG. 13, the reception amplification circuit 1060 includes a second power amplifier 1061 and a fourth switch 1062. An input end of the second power amplifier 1061 is connected to a first end of the fourth switch 1062, a second end of the fourth switch 1062 is connected to the output end of the balanced combination amplification circuit 1020, and the second end of the fourth switch is further configured to be connected to the antenna 1070. In this case, the input end of the reception amplification circuit 1060 is the second end of the fourth switch 1062. An LNA is usually used as the second power amplifier 1061.

When the antenna 1070 transmits the amplified first signal, the fourth switch 1062 is in an open state; and when the antenna 1070 receives the second signal, the fourth switch 1062 is in a closed state. To be specific, when the antenna 1070 needs to transmit the amplified first signal, the fourth switch 1062 is in an open state, and the second power amplifier 1061 is open-circuited. In this case, the first impedance is in a high impedance state, and the balanced combination amplification circuit 1020 amplifies the first signal. When the antenna 1070 receives the second signal, the fourth switch 1062 is in a closed state, the impedance adjustment circuit 1050 adjusts the second impedance to a high impedance state, and the second power amplifier 1601 amplifies the second signal received by using the antenna 1070. In this way, transmission/reception separation may be implemented.

Figure 14:
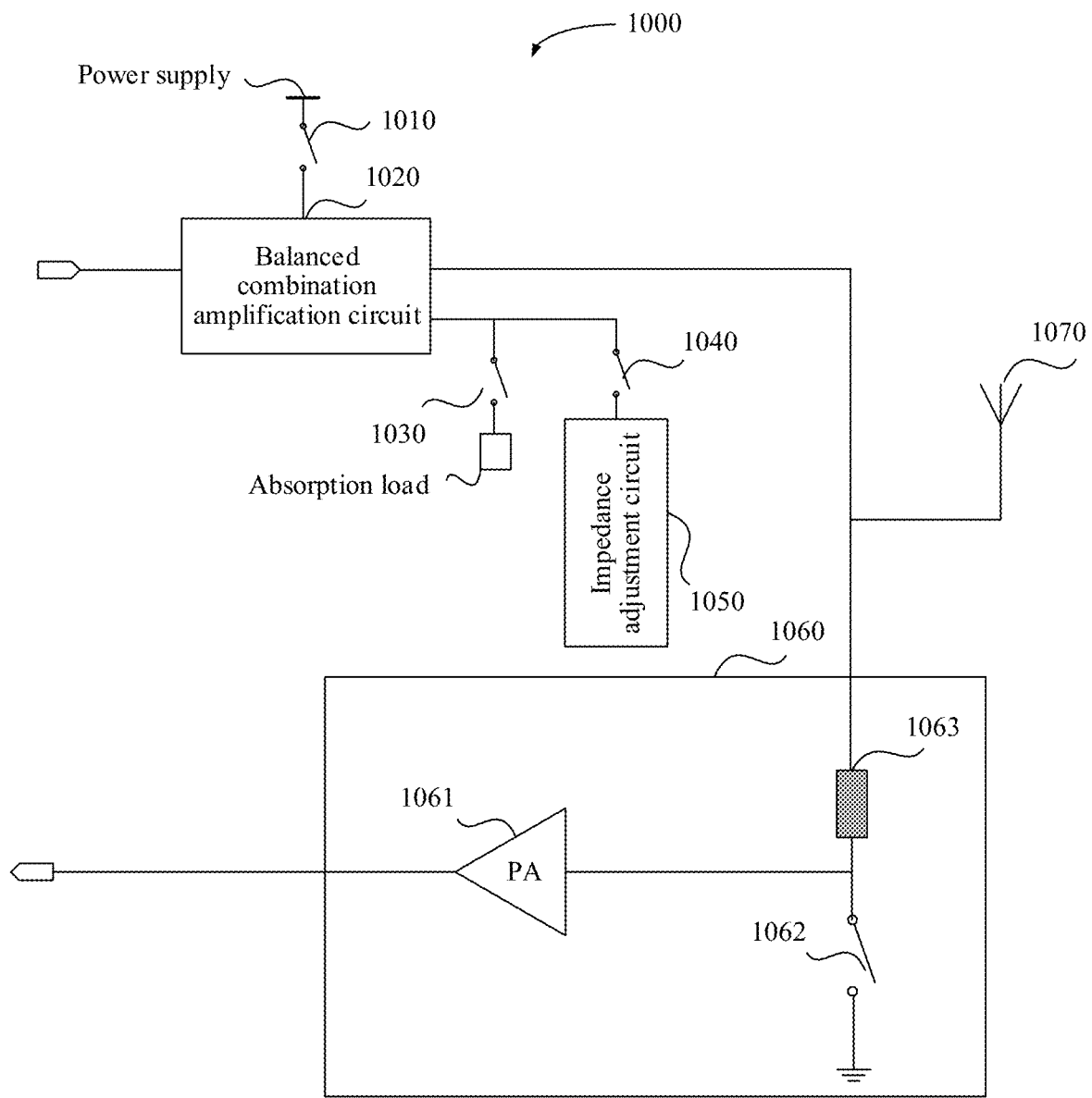
FIG. 14 is a second schematic structural diagram of a reception amplification circuit in another reception amplification circuit according to an embodiment of this application.

Manner 2: As shown in FIG. 14, the reception amplification circuit 1060 includes a second power amplifier 1061, a quarter-wave transformer 1063, and a fourth switch 1062. An input end of the second power amplifier 1061 is separately connected to a first end of the fourth switch 1062 and a first end of the quarter-wave transformer 1063, a second end of the quarter-wave transformer 1063 is connected to the output end of the balanced combination amplification circuit 1020, the second end of the quarter-wave transformer 1063 is further configured to be connected to the antenna 1070, and a second end of the fourth switch 1062 is grounded. In this case, the input end of the reception amplification circuit 1060 is the second end of the quarter-wave transformer 1603.

When the antenna 1070 transmits the amplified first signal, the fourth switch 1062 is in a closed state; and when the antenna 1070 receives the second signal, the fourth switch 1062 is in an open state. To be specific, when the antenna 1070 needs to transmit the amplified first signal, the fourth switch 1062 is in a closed state. Because a receive channel is grounded by using the quarter-wave transformer 1603, the first impedance is in a high impedance state, and the balanced combination amplification circuit 1020 amplifies the first signal. When the antenna 1070 receives the second signal, the fourth switch 1062 is in an open state, the impedance adjustment circuit 1050 adjusts the second impedance to a high impedance state, and the second power amplifier 1601 amplifies the second signal received by using the antenna 1070. In this way, transmission/reception separation may be implemented.

In the foregoing solution, for the transmission/reception separation circuit 1000, when the antenna 1070 transmits the amplified first signal, the impedance seen from the input end of the reception amplification circuit 1060 in the transmission/reception separation circuit 1000 is in a high impedance state, and the antenna 1070 transmits the first signal amplified by the balanced combination amplification circuit 1020 in the transmission/reception separation circuit 1000. When the antenna 1070 receives the second signal, the impedance adjustment circuit 1050 in the transmission/reception separation circuit 1000 adjusts the impedance seen from the output end of the balanced combination amplification circuit 1020 to a high impedance state, and the reception amplification circuit 1060 amplifies the second signal received by using the antenna 1070. In this way, transmission/reception separation can be implemented. In addition, when the antenna 1070 receives the second signal, a transmit channel is isolated from a receive channel by using the impedance adjustment circuit 1050 without introducing a switch element, thereby avoiding a loss on the transmit channel caused by a switch in a transmission/reception isolation process. Compared with a conventional technology, this solution causes a relatively small loss on the transmit channel and can improve transmission efficiency.

Based on the foregoing embodiments, this application further provides a transceiver. The transceiver includes the antenna and the transmission/reception isolation circuit 200 or the transmission/reception isolation circuit 1000 in any one of the foregoing possible manners.

This application further provides a wireless communications device. The wireless communications device includes the transceiver and a processor. The processor is configured to control the transceiver to receive or send a signal.

In specific implementation, the processor may control a status of a switch in the transmission/reception isolation circuit 200 or the transmission/reception isolation circuit 1000 in the transceiver to control the transceiver to receive or send a signal. For example, when the transmission/reception isolation circuit 200 in the transceiver has a structure shown in FIG. 15, and the wireless communications device needs to send the first signal by using the antenna 240, the processor controls the first switch 211 and the second switch 214 to be closed, and controls the third switch 232 to be opened. In this case, the Wilkinson balanced combination amplification circuit is in a working state to amplify the first signal, and the antenna 240 transmits the amplified first signal. The second power amplifier 231 is in an open-circuit state, and therefore the first impedance is in a high impedance state (in this case, the first impedance is infinite). When the wireless communications device receives the second signal by using the antenna 240, the processor controls the first switch 211 and the second switch 214 to be opened, and controls the third switch 232 to be closed. In this case, the Wilkinson balanced combination amplification circuit does not work, the impedance adjustment circuit 220 adjusts the second impedance to a high impedance state, and the second power amplifier 231 amplifies the second signal received by using the antenna 240.

Figure 16:
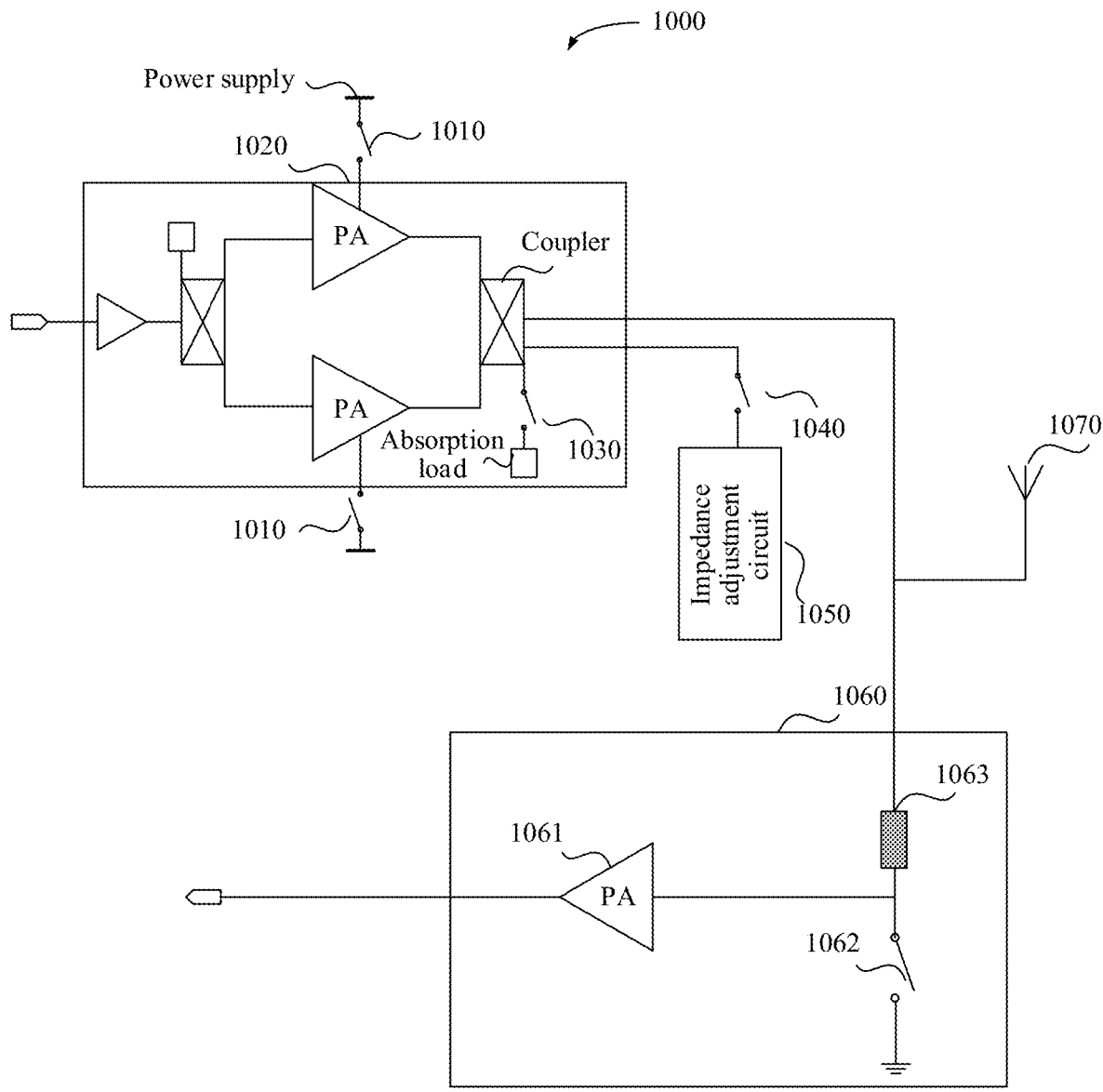
FIG. 16 is a specific schematic structural diagram of another transmission/reception separation circuit according to an embodiment of this application.

For another example, when the transmission/reception isolation circuit 1000 in the transceiver has a structure shown in FIG. 16, and the wireless communications device needs to send the first signal by using the antenna 1070, the processor controls the first switch 1010, the second switch 1030, and the fourth switch 1062 to be closed, and controls the third switch 1030 to be opened. In this case, the 3 dB bridge balanced combination amplification circuit is in a working state to amplify the first signal, and the antenna 1070 transmits the amplified first signal. Because a receive channel is grounded by using the quarter-wave transformer 1603, the first impedance is in a high impedance state. When the wireless communications device receives the second signal by using the antenna 1070, the processor controls the first switch 1010, the second switch 1030, and the fourth switch 1062 to be opened, and controls the third switch 1040 to be closed. The impedance adjustment circuit 220 adjusts the second impedance to a high impedance state, and the second power amplifier 1061 amplifies the second signal received by using the antenna 1070.

Figure 15:
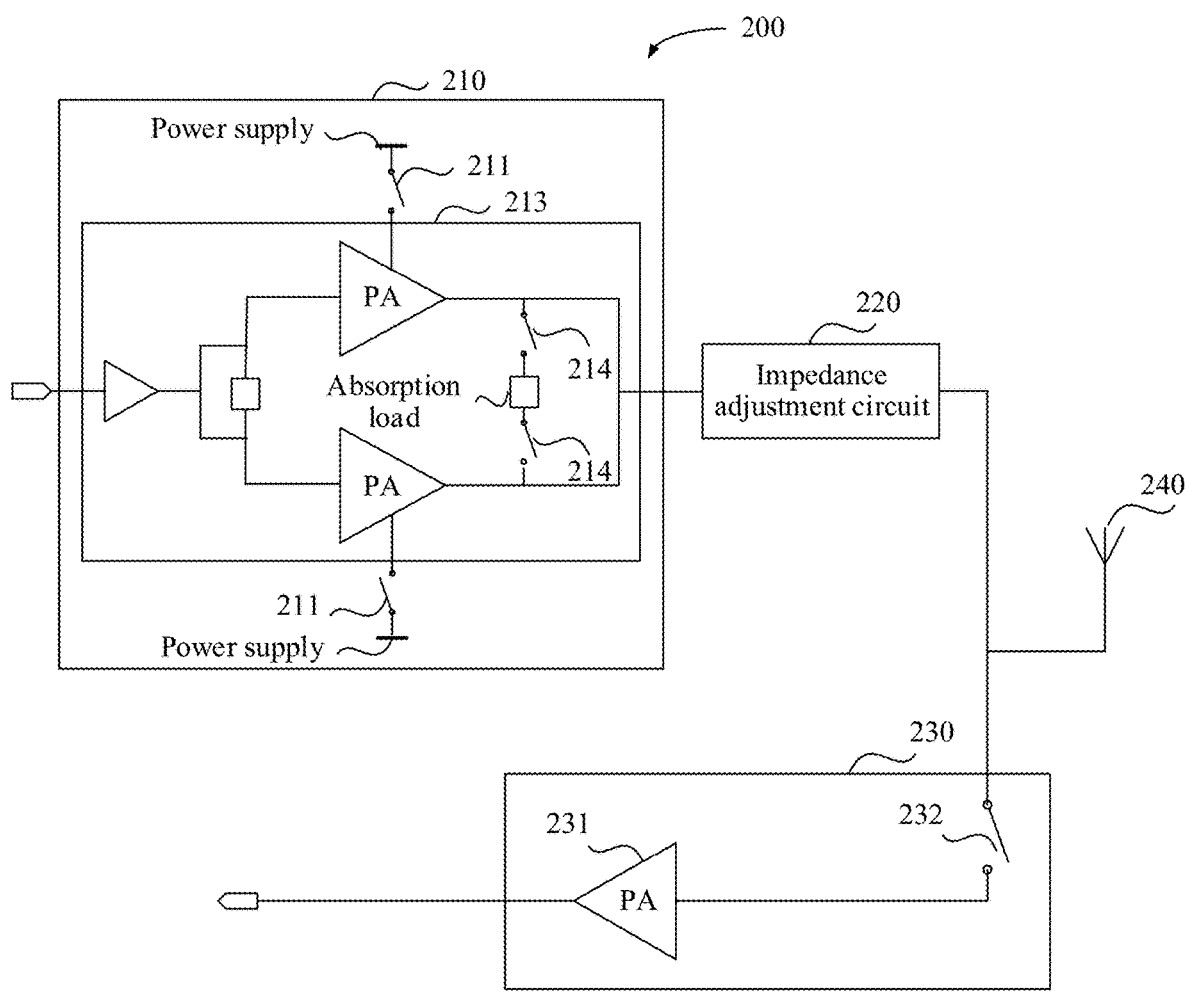
FIG. 15 is a specific schematic structural diagram of a transmission/reception separation circuit according to an embodiment of this application.

When the transmission/reception separation circuit in the transceiver uses another structure different from the structures shown in FIG. 15 and FIG. 16, a method for controlling the transmission/reception separation circuit by the processor is similar to the control methods in the foregoing two scenarios. Details are not described herein again.

In addition, it should be noted that the high impedance state described in the embodiments of this application is a state in which an impedance is far greater than a system impedance seen from the antenna. When a node in a circuit is in the high impedance state, a channel on which the node is located may be considered as an open circuit or nearly an open circuit. The switch in the embodiments of this application may be a switch such as a BJT, a MOSFET, an insulated gate bipolar transistor (insulated gate bipolar transistor, IGBT), or a relay. The plurality of switches included in the transmission/reception separation circuit may be switches of a same type or may be switches of different types.

Obviously, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A transmission/reception separation circuit, comprising: a transmission amplification circuit, an impedance adjustment circuit, and a reception amplification circuit, wherein:
    an output end of the transmission amplification circuit is connected to a first end of the impedance adjustment circuit, a second end of the impedance adjustment circuit is connected to an input end of the reception amplification circuit, and the second end of the impedance adjustment circuit and the input end of the reception amplification circuit are further configured to be connected to an antenna;
    the transmission amplification circuit is configured to amplify a first signal to be transmitted by using the antenna;
    the reception amplification circuit is configured to amplify a second signal received by using the antenna, wherein when the antenna transmits the amplified first signal, a first impedance is in a high impedance state, and the first impedance is an impedance seen from the input end of the reception amplification circuit;
    the reception amplification circuit comprises a reception power amplifier and a reception switch, an input end of the reception power amplifier is connected to a first end of the reception switch, a second end of the reception switch is connected to the second end of the impedance adjustment circuit, and the second end of the reception switch is further configured to be connected to the antenna; and
    the impedance adjustment circuit is configured to adjust a second impedance to a high impedance state when the antenna receives the second signal, wherein the second impedance is an impedance seen from the second end of the impedance adjustment circuit.

2. The transmission/reception separation circuit according to claim 1, wherein the impedance adjustment circuit is a circuit formed through hybrid connection of a capacitor and an inductor, or a microstrip circuit.

3. The transmission/reception separation circuit according to claim 1, wherein:
    the transmission amplification circuit comprises a first switch and a first power amplifier, the first switch is separately connected to a power supply end of the first power amplifier and a power supply of the first power amplifier, and an output end of the first power amplifier is connected to the first end of the impedance adjustment circuit;
    when the antenna transmits the amplified first signal, the first switch is in a closed state; and
    when the antenna receives the second signal, the first switch is in an open state.

4. The transmission/reception separation circuit according to claim 1, wherein:
    the transmission amplification circuit comprises a first switch, a balanced combination amplification circuit, and a second switch, the first switch is separately connected to a power supply end of a power amplifier in the balanced combination amplification circuit and a power supply of the power amplifier in the balanced combination amplification circuit, an absorption load at an isolation end of the balanced combination amplification circuit is connected to the isolation end of the balanced combination amplification circuit by using the second switch, and an output end of the balanced combination amplification circuit is connected to the first end of the impedance adjustment circuit;
    when the antenna transmits the amplified first signal, the first switch and the second switch are in a closed state; and
    when the antenna receives the second signal, the first switch and the second switch are in an open state.

5. The transmission/reception separation circuit according to claim 4, wherein the balanced combination amplification circuit is a 3 dB bridge balanced combination amplification circuit, the isolation end of the 3 dB bridge balanced combination amplification circuit is connected to the absorption load by using the second switch, and the output end of the 3 dB bridge balanced combination amplification circuit is connected to the first end of the impedance adjustment circuit.

6. The transmission/reception separation circuit according to claim 4, wherein the balanced combination amplification circuit is a Wilkinson balanced combination amplification circuit, the transmission amplification circuit comprises two second switches, two ends of the absorption load at the isolation end of the Wilkinson balanced combination amplification circuit are separately connected in parallel at the isolation end of the Wilkinson balanced combination amplification circuit by using the two second switches, and the output end of the Wilkinson balanced combination amplification circuit is connected to the first end of the impedance adjustment circuit.

7. The transmission/reception separation circuit according to claim 1, wherein:
    when the antenna transmits the amplified first signal, the reception switch is in an open state; and when the antenna receives the second signal, the reception switch is in a closed state.

8. A transceiver, applied to a wireless communications device, comprising a transmission/reception separation circuit, wherein the transmission/reception separation circuit comprises:
a transmission amplification circuit, an impedance adjustment circuit, and a reception amplification circuit, wherein:
an output end of the transmission amplification circuit is connected to a first end of the impedance adjustment circuit, a second end of the impedance adjustment circuit is connected to an input end of the reception amplification circuit, and the second end of the impedance adjustment circuit and the input end of the reception amplification circuit are further configured to be connected to an antenna;
the transmission amplification circuit is configured to amplify a first signal to be transmitted by using the antenna;
the reception amplification circuit is configured to amplify a second signal received by using the antenna, wherein when the antenna transmits the amplified first signal, a first impedance is in a high impedance state, and the first impedance is an impedance seen from the input end of the reception amplification circuit;
the reception amplification circuit comprises a reception power amplifier and a reception switch, an input end of the reception power amplifier is connected to a first end of the reception switch, a second end of the reception switch is connected to the second end of the impedance adjustment circuit, and the second end of the reception switch is further configured to be connected to the antenna; and
the impedance adjustment circuit is configured to adjust a second impedance to a high impedance state when the antenna receives the second signal, wherein the second impedance is an impedance seen from the second end of the impedance adjustment circuit.

9. The transceiver according to claim 8, wherein the impedance adjustment circuit is a circuit formed through hybrid connection of a capacitor and an inductor, or a microstrip circuit.

10. The transceiver according to claim 8, wherein:
the transmission amplification circuit comprises a first switch and a first power amplifier, the first switch is separately connected to a power supply end of the first power amplifier and a power supply of the first power amplifier, and an output end of the first power amplifier is connected to the first end of the impedance adjustment circuit;
when the antenna transmits the amplified first signal, the first switch is in a closed state; and
when the antenna receives the second signal, the first switch is in an open state.

11. The transceiver according to claim 8, wherein:
the transmission amplification circuit comprises a first switch, a balanced combination amplification circuit, and a second switch, the first switch is separately connected to a power supply end of a power amplifier in the balanced combination amplification circuit and a power supply of the power amplifier in the balanced combination amplification circuit, an absorption load at an isolation end of the balanced combination amplification circuit is connected to the isolation end of the balanced combination amplification circuit by using the second switch, and an output end of the balanced combination amplification circuit is connected to the first end of the impedance adjustment circuit;
when the antenna transmits the amplified first signal, the first switch and the second switch are in a closed state; and
when the antenna receives the second signal, the first switch and the second switch are in an open state.

12. The transceiver according to claim 11, wherein the balanced combination amplification circuit is a 3 dB bridge balanced combination amplification circuit, the isolation end of the 3 dB bridge balanced combination amplification circuit is connected to the absorption load by using the second switch, and the output end of the 3 dB bridge balanced combination amplification circuit is connected to the first end of the impedance adjustment circuit.

13. The transceiver according to claim 11, wherein the balanced combination amplification circuit is a Wilkinson balanced combination amplification circuit, the transmission amplification circuit comprises two second switches, two ends of the absorption load at the isolation end of the Wilkinson balanced combination amplification circuit are separately connected in parallel at the isolation end of the Wilkinson balanced combination amplification circuit by using the two second switches, and the output end of the Wilkinson balanced combination amplification circuit is connected to the first end of the impedance adjustment circuit.

* * * * *